April 22, 1969     C. H. HENRY ET AL     3,439,974
TUNABLE LIGHT FILTER

Filed March 11, 1966     Sheet 1 of 2

INVENTORS: C.H. HENRY
D.G. THOMAS
BY
David P. Kelley
ATTORNEY

United States Patent Office 3,439,974
Patented Apr. 22, 1969

3,439,974
TUNABLE LIGHT FILTER
Charles H. Henry, Murray Hill, and David G. Thomas, Summit, N.J., assignors to Bell Telephone Laboratories, Incorporated, New York, N.Y., a corporation of New York
Filed Mar. 11, 1966, Ser. No. 533,654
Int. Cl. G02f 1/24
U.S. Cl. 350—149   9 Claims This invention relates to light filters, and more particularly, to light filters of crystalline material having extremely narrow bandpass characteristics.

The greatly increased research and development in the optics field, stimulated at least in part by the optical maser, has necessitated the development of numerous components which have their counterparts in the microwave field. One such component having a great deal of utility is the bandpass or band reject filter.

At the present time, most bandpass light filters are of the interference type which, while adequate for some purposes, possess numerous drawbacks which severely limit their utility. In general, interference filters are not tunable, and those few that are are so sensitive to tuning variations that it is difficult to tune them accurately. It is necessary, for precise filtering, that the light directed into or through the filter have a fixed angle of incidence onto the filter, since any change in direction of the light drastically changes the filter characteristics. Because of this angular sensitivity, where it is desired to filter a single frequency or a very narrow frequency band, collimated light must be used rather than focused light, with a consequent reduction in both filter and transmission efficiency.

Most interference filters comprise an arrangement of mirrors, or single multilayered mirrors, and are, by their very nature, difficult to build for functioning at a particular exact frequency. In addition, these devices have, at best, a fairly broad characteristic, that is, they pass other frequencies besides the desired one. Furthermore, these filters usually cannot be made to function as either a bandpass or a band reject filter, being limited, generally, to the bandpass function.

All of the foregoing shortcomings of prior art light filters are eliminated by, or do not exist in, the present invention.

The present invention is based upon the fact that certain anisotropic crystals have one or more isotropic points, that is, they are isotropic at one or more discrete frequencies. Stated another way, at one or more frequencies the ordinary and extraordinary indices of refraction are equal.

In an illustrative embodiment of the invention, a thin crystal slab of cadmium sulfide (CdS) is situated between a pair of crossed polarizing filters. Light to be filtered is directed through one of the polarizers into the crystal. Means such as a C-clamp is provided for applying a compression stress to the crystal in a plane normal to the direction of propagation of the light through the crystal. In an anisotropic material such as cadmium sulfide, at energies below the band gap, the indices of refraction for the ordinary and extraordinary modes are different. However, at one or more discrete frequencies, the indices are the same, and application of a stress to the crystal causes the modes to couple and exchange energy therebetween. As a consequence, light energy incident on the crystal that is polarized in one direction will transfer its energy into light polarized in a second direction at the frequency where isotropy occurs. The second polarizer, when polarized to pass the light polarized in the second direction, rejects light of other polarizations and hence passes light of substantially a single frequency.

Conversely, when the second polarizer is polarized the same as the first polarizer, all of the light except that of the single frequency is passed. Consequently, the device of the invention can be made to have an extremely sharp bandpass or an extremely sharp band reject characteristic.

The frequency at which isotropy occurs in the crystal can be shifted by varying the temperature of the crystal or by the application of an electric field across the crystal. As a consequence, in one embodiment of the invention temperature tuning means are provided and in another embodiment of the invention, electrical tuning means are provided.

It is a principal feature of the present invention that an anisotropic crystal which is isotropic at one or more frequencies has applied thereto means for producing coupling between waves of different polarizations at the frequency of isotropy, and is supplied with means for discriminating between waves of different polarizations.

It is another feature of the invention that the frequency at which isotropy occurs in the crystal is varied by suitable means.

These and other features of the present invention will be more readily apparent from the following detailed description, taken in conjunction with the accompanying drawings, in which.

Figure 1:
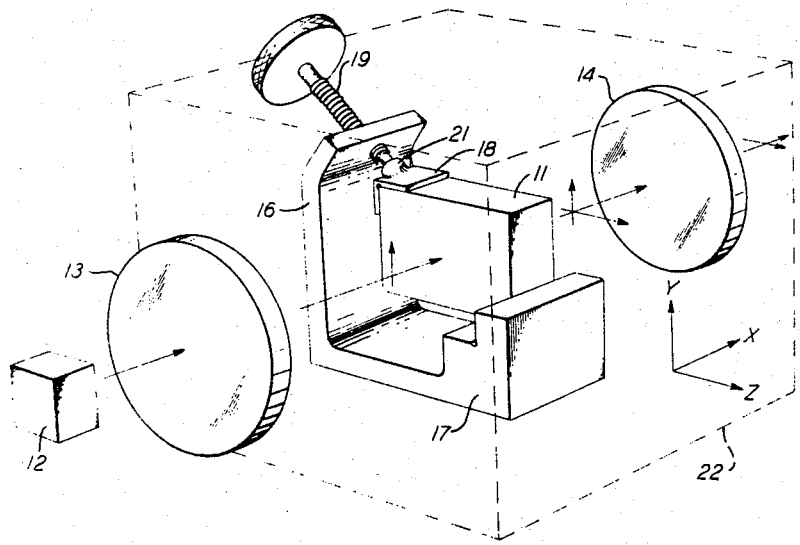
FIG. 1 is a perspective view of an illustrative embodiment of the invention.
Figure 2:
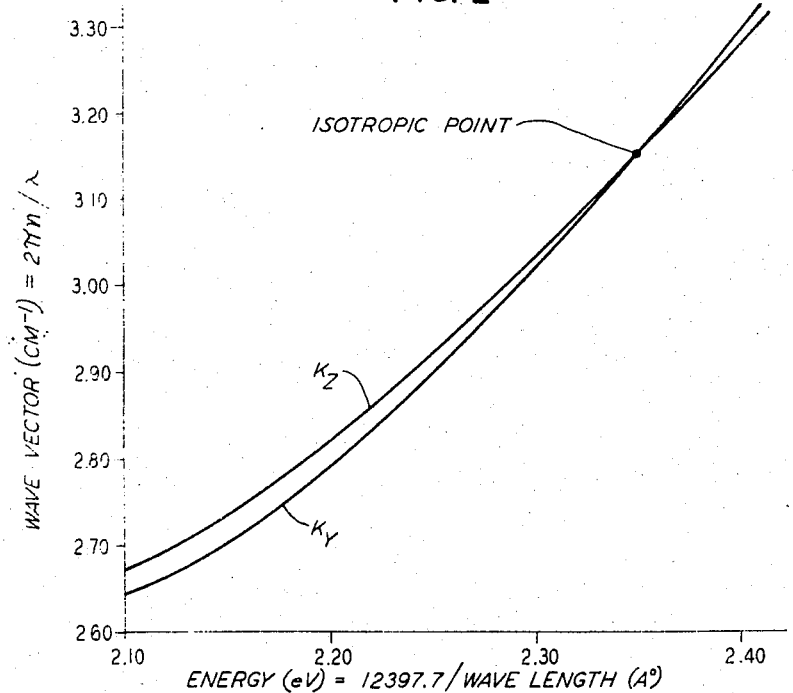
FIG. 2 is a graph of certain of the parameters of the crystal of FIG. 1.

Turning now to FIG. 1, there is shown a light filter arrangement embodying the principles of the present invention. The arrangement comprises a crystal slab 11 of suitable material such as, for example, CdS or ZnO (zinc oxide), which normally is anisotropic, but at a certain frequency is isotropic. In FIG. 2 there is shown a plot of an index of refraction term (wave vector) versus a wavelength in angstroms term (electron volts) for light passing through a CdS crystal, for $x$ and $y$ polarizations of the light. It can be seen that at an energy of approximately 2.36 ev., the index of refraction is the same for both polarizations, that is, the crystal is isotropic at that point.

In FIG. 1, a light beam from a suitable source 12, which may take any of a number of forms, is directed through a polarizer 13, which polarizes the light parallel to the $y$ axis of crystal 11, and into crystal 11. Assuming that the light beam contains a number of frequencies including the frequency of isotropy in the crystal, those other frequencies pass through crystal 11 and impinge upon a polarizer 14 which passes light polarized parallel to the $z$ axis of the crystal, and blocks other polarizations. accordingly, those frequencies other than the frequency of isotropy are blocked by polarizer 14.

Light at the isotropic frequency, however, has the same propagation characteristics regardless of polarization because of the identity of the refractive index at this frequency. As a consequence, it is possible to change the polarization of this light through mode coupling. This coupling can be produced by application of a magnetic field parallel to the $x$ axis. However, it has been found that application of a stress to the crystal produces a high degree of coupling in a much more feasible manner. In the arrangement of FIG. 1, a compressive stress is applied to crystal 11 at an angle of forty-five degrees to the $z$ axis by means of a C-clamp 16 having a stepped block 17 in which one corner of crystal 11 rests, and a V-block 18 mounted at the end of a thumb screw 19 by means of a ball and socket joint 21. The stress applied to crystal 11 is varied by rotation of thumb screw 19 which produces a translational movement of block 18. It has been found that substantially complete coupling of light polarized in the y direction to light polarized in the z direction is achieved in a crystal one-half millimeter thick with a stress of 0.66 kilogram per mm.$^2$.

When there is complete coupling, the light at the isotropic frequency is converted from a vertical polarization to a horizontal polarization and passes freely through polarizer 14. It can be seen, therefore, that of the light from source 12, substantially a single frequency is passed by the filter arrangement of FIG. 1.

The arrangement of FIG. 1 can readily be made to reject a single frequency by rotating polarizer 14 so that it passes light polarized parallel to the y axis.

For optimum results with the arrangement of FIG. 1, the C-axis (axis of six-fold rotational symmetry) of the crystal should be oriented parallel to the z axis and the stress applied at forty-five degrees to the z axis. Other orientations of the C-axis and the stress will work, however. It is to be understood that the arrangement for applying the stress, as shown in FIG. 1, is for purposes of illustration only.

Figure 3A:
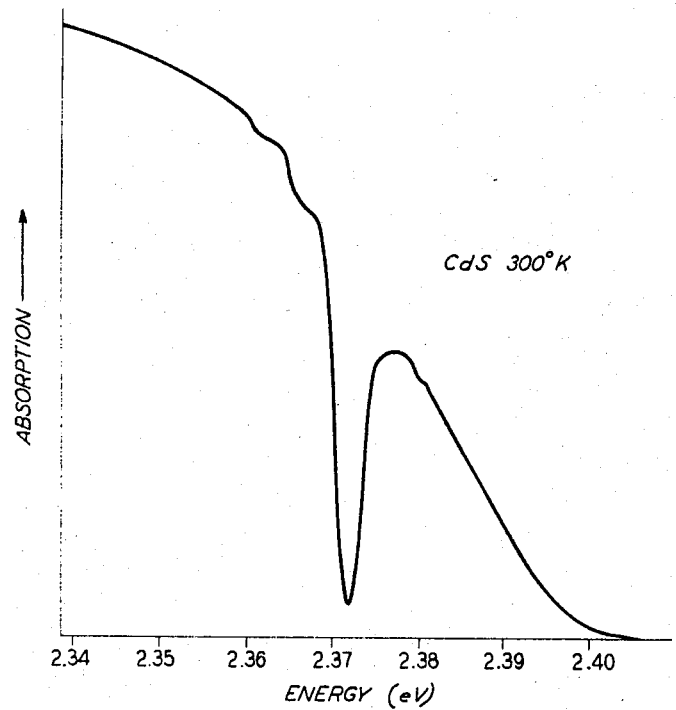
FIGS. 3A and 3B are graphs of the light transmission characteristics of the arrangement of FIG. 1.
Figure 3B:
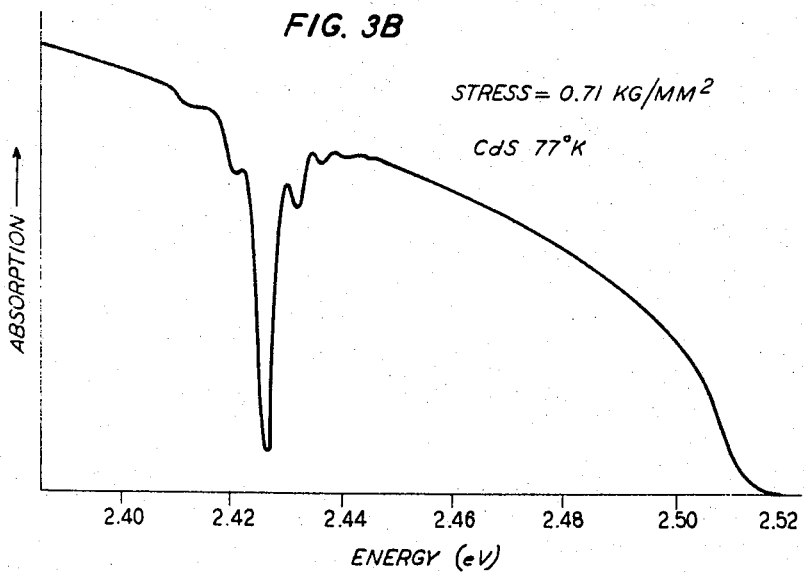

The frequency at which the crystal is isotropic can be changed by varying the temperature of the crystal in FIG. 1. Accordingly, there is shown in dotted outline a temperature control chamber 22 which may take any one of a number of suitable forms, depending on the degree of temperature variations required, for example, or on other considerations. Because numerous temperature control arrangements are possible, the enclosure 22 of FIG. 1 has been shown, for simplicity, in dotted outline only. FIGS. 3A and 3B are plots of the light absorption for light incident on crystal 11 with a z axis polarization for CdS at temperatures of 300° K. and 77° K., respectively, and with polarizer 14 polarized in the y direction. It can be seen that the isotropic point in FIG. 3B, approximately at 2.425 electron volts is considerably shifted from the corresponding point, approximately 2.372 electron volts, in FIG. 3A, a change of approximately 118 angstroms. The pass-band of the crystal may also be shifted by the application of an electric field to the crystal, such as a voltage applied across the crystal parallel to one of the axes. Electrical tuning makes feasible the frequency modulation of an incident light beam. An example of electrical tuning of a crystal is disclosed in the copending United States patent application of J. A. Giordmaine and R. C. Miller, Ser. No. 459,173, filed May 27, 1965, now abandoned.

In addition to ZnO and CdS, mixed crystals may be made from varying combinations of, for example, CdS and CdSe (cadmium selenide). In this way various specific frequencies may be filtered.

The filter characteristic may be sharpened and cleaned up by putting several crystals in series and passing the light sequentially through them. In practice it has been found that the filter characteristic of a single crystal is extremely sharp and sufficient for most purposes.

The foregoing discussion has been for purposes of illustrating the principles of the invention. Numerous arrangements embodying these principles may occur to workers in the art without departing from the spirit and scope of the invention.

What is claimed is:

1. A light filter comprising an anisotropic crystal disposed between first and second light polarizing members, said crystal being characterized by ordinary and extraordinary indices of refraction which are equal at a discrete frequency, means directing a beam of light having a plurality of frequencies through said first polarizer, said crystal, and onto said second polarizer, and means for controlling the light passing through said second polarizer comprising means for producing coupling within said crystal between the ordinary and extraordinary rays of light of said discrete frequency.

2. A light filter as claimed in claim 1 wherein said second polarizer is polarized at ninety degrees to said first polarizer.

3. A light filter as claimed in claim 1 wherein said second polarizer is polarized parallel to said first polarizer.

4. A light filter as claimed in claim 1 wherein said means for producing coupling between the ordinary and extraordinary rays comprises means for applying a compressional stress to said crystal.

5. A light filter as claimed in claim 4 wherein said stress applying means applies compression to the crystal in a plane normal to the direction of the beam of light through the crystal.

6. A light filter comprising an anisotropic crystal disposed between first and second light polarizing members, said crystal being characterized by ordinary and extraordinary indices of refraction which are equal at a discrete frequency, means for directing a beam of light having a plurality of frequencies through said first polarizer, said crystal, and onto said second polarizer, means for controlling the light passing through said second polarizer comprising means for producing coupling within said crystal between the ordinary and extraordinary rays of light of said discrete frequency, and means for changing the discrete frequency at which the indices of refraction are equal.

7. A light filter as claimed in claim 6 wherein said last mentioned means comprises means for varying the temperature of said crystal.

8. A light filter as claimed in claim 7 wherein said means for producing coupling within said crystal comprises means for applying a compressional stress to said crystal.

9. A light filter as claimed in claim 8 wherein said stress applying means applies compression to the crystal in a plane normal to the direction of the beam of light through the crystal.

References Cited

J. J. Hopfield and D. G. Thomas, "Polariton Absorption Lines," Phys. Rev. Let., vol. 15, No. 1 (July 5, 1965), pp. 22–25.

DAVID SCHONBERG, *Primary Examiner.*

PAUL R. MILLER, *Assistant Examiner.*

U.S. Cl. X.R.

350—150, 157, 160, 161, 166.